(12) United States Patent
Nagayasu

(10) Patent No.: US 9,156,317 B2
(45) Date of Patent: Oct. 13, 2015

(54) PNEUMATIC TIRE

(75) Inventor: Masaaki Nagayasu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 943 days.

(21) Appl. No.: 13/165,644

(22) Filed: Jun. 21, 2011

(65) Prior Publication Data

US 2011/0315290 A1    Dec. 29, 2011

(30) Foreign Application Priority Data

Jun. 25, 2010   (JP) .................................. 2010-144926

(51) Int. Cl.
B60C 11/12          (2006.01)

(52) U.S. Cl.
CPC ............. B60C 11/1218 (2013.01); B60C 11/12 (2013.01)

(58) Field of Classification Search
CPC ............ B60C 11/1204; B60C 11/1218; B60C 11/1236; B60C 11/1259; B60C 11/1263
USPC ............................. 152/209.18, 209.25, 209.21
See application file for complete search history.

(56) References Cited

U.S. PATENT DOCUMENTS

| | | | | |
|---|---|---|---|---|
| 8,875,760 B2 * | 11/2014 | Nagayasu | ................. | 152/209.21 |
| 2005/0109438 A1 | 5/2005 | Collette et al. | | |
| 2009/0223613 A1 | 9/2009 | Saeki | | |
| 2013/0146191 A1* | 6/2013 | Audigier et al. | ......... | 152/209.21 |

FOREIGN PATENT DOCUMENTS

| | | | |
|---|---|---|---|
| EP | 1170153 | | 1/2002 |
| EP | 1 533 141 | | 5/2005 |
| JP | 05058118 A | * | 3/1993 |
| JP | 11-105512 | | 4/1999 |
| JP | 3180160 | | 4/2001 |
| JP | 2002-187412 | | 7/2002 |
| JP | 2002-31657 | | 10/2002 |
| JP | 2004-262285 | | 9/2004 |
| JP | 2005-067274 | | 3/2005 |
| JP | 2006-035933 | | 2/2006 |
| JP | 2006-168501 | | 6/2006 |
| JP | 2007-137110 | | 6/2007 |
| JP | 2008-132809 | | 6/2008 |
| JP | 2008-189251 | | 8/2008 |
| JP | 2009-126293 | | 6/2009 |
| JP | 2009214692 | | 9/2009 |
| RU | 2388620 | | 5/2010 |
| WO | WO 99/48707 | | 9/1999 |

(Continued)

OTHER PUBLICATIONS

JPO machine translation of JP 05-058118, retrieved Jun. 4, 2014.*
Russian Notice of Allowance mailed Aug. 15, 2012.

(Continued)

Primary Examiner — Timothy Kennedy
(74) Attorney, Agent, or Firm — Thorpe North & Western

(57) ABSTRACT

A pneumatic tire wherein a sipe includes protrusions on a first sipe wall face of mutually opposing sipe wall faces and recesses that mate with the protrusions in a second sipe wall face. Additionally, in a projection figure of the protrusions with the sipe wall faces in an expanded state, a relationship between a placement density X of the protrusions in a region that extends up to half of a sipe depth H from an opening of the sipe and a placement density Y of the protrusions in a region that extends up to half of the sipe depth H from a bottom of the sipe is X>Y.

20 Claims, 6 Drawing Sheets

A-A VIEW

(56) References Cited

FOREIGN PATENT DOCUMENTS

| | | |
|---|---|---|
| WO | WO 2006013694 | 2/2006 |
| WO | WO 2008010778 | 1/2008 |

OTHER PUBLICATIONS

Chinese Office Action dated Jun. 4, 2013, 12 pages, China.
German Office Action mailed Mar. 15, 2012.

* cited by examiner

| | Conventional Example | Working Example 1 | Working Example 2 | Working Example 3 | Working Example 4 | Working Example 5 |
|---|---|---|---|---|---|---|
| X/S | 100 | 130 | 105 | 110 | 150 | 200 |
| Dry braking | 100 | 103 | 101 | 100 | 100 | 100 |
| Braking on ice | 100 | 103 | 101 | 100 | 100 | 100 |
| Braking on ice at 50% wear | 100 | 105 | 100 | 102 | 105 | 105 |

|  | Conventional Example | Working Example 1 | Working Example 6 | Working Example 7 | Working Example 8 | Working Example 9 | Working Example 10 | Working Example 11 |
|---|---|---|---|---|---|---|---|---|
| X/S | 100 | 130 | 130 | 130 | 130 | 130 | 130 | 130 |
| A/S | 100 | 100 | 105 | 150 | 250 | 150 | 150 | 150 |
| B/S | 100 | 100 | 70 | 70 | 70 | 105 | 110 | 200 |
| Dry braking | 100 | 103 | 103 | 105 | 103 | 103 | 107 | 105 |
| Braking on ice | 100 | 103 | 103 | 105 | 103 | 103 | 107 | 105 |
| Braking on ice at 50% wear | 100 | 105 | 105 | 105 | 105 | 105 | 105 | 105 |

FIG. 7

PNEUMATIC TIRE

PRIORITY CLAIM

Priority is claimed to Japan Patent Application Serial No. 2010-144926 filed on Jun. 25, 2010.

BACKGROUND

1. Technical Field

The present technology relates to a pneumatic tire, and more specifically, to a pneumatic tire having enhanced braking performance on ice.

2. Related Art

Conventional pneumatic tires include a plurality of circumferential main grooves and block-like land portions that are partitioned by the circumferential main grooves in a tread portion. Additionally, the land portions include a plurality of sipes extending in a tire width direction. Thereby, the edge effect of the tire is enhanced.

However, in recent years, there has been a growing trend toward increasing the number of sipes provided and, while leading to an enhancement in the edge effect of the tire, this also results in problems such as a decline in rigidity of the entire block and a decline in the dry braking performance and braking performance on ice of the tire.

Therefore, in order to solve these problems, a configuration is used in which protrusions and recesses that mutually mate are provided in sipe wall faces. With this configuration, when a tire brakes, the rigidity of the land portion is increased due to the sipes sealing and the protrusions and recesses mating. Thereby, the braking performance on ice of the tire is enhanced. The technology described in Japanese Patent No. 3180160 is known as a conventional pneumatic tire that is configured in this manner.

SUMMARY

The present technology provides a pneumatic tire having enhanced braking performance on ice. The pneumatic tire includes, in a tread portion, a plurality of grooves and a land portion partitioned by the grooves. The land portion includes a plurality of sipes extending in a tire width direction. The sipe includes protrusions on a first sipe wall face of mutually opposing sipe wall faces and recesses that mate with the protrusions in a second sipe wall face. Additionally, in a projection figure of the protrusions with the sipe wall faces in an expanded state, a relationship between a placement density X of the protrusions in a region that extends up to half of a sipe depth from an opening of the sipe and a placement density Y of the protrusions in a region that extends up to half of the sipe depth from a bottom of the sipe is X>Y.

With this pneumatic tire, when the tire brakes, an external force acts in a collapsing direction of the land portions, which leads to the sipe sealing and the protrusions and the recesses mating. Here, the placement density X of the protrusions in the sipe wall face is set so as to be greater on an opening side. Therefore, compared to a configuration where the placement density of the protrusions is uniform, a large mating force between the protrusions and recesses on the opening side of the sipe can be obtained. As a result, the rigidity of the land portions is efficiently increased and collapsing of the sipe is suppressed. Such a configuration is beneficial because the braking performance on ice and dry braking performance of the tire are enhanced.

Additionally, with the pneumatic tire of the present technology, a ratio X/S of the placement density X of the protrusions to a placement density S of the protrusions in all regions of the sipe wall face is within a range of $105\% \leq (X/S) \times 100 \leq 200\%$.

With this pneumatic tire, the placement density X of the protrusions in an opening side region is optimized Therefore, optimal braking performance on ice and dry braking performance of the tire are ensured or enhanced.

Moreover, with the pneumatic tire of the present technology, at at least one end of the sipe, a ratio A/S of a placement density A of the protrusions in a region that extends up to 20% of a sipe length from the end of the sipe to a placement density S of the protrusions in all regions of the sipe wall face is within a range of $105\% \leq (A/S) \times 100 \leq 250\%$.

With this pneumatic tire, the placement density A of the protrusions at the end of the sipe is set so as to be great. Therefore, when the tire brakes, the protrusions and recesses mate, and this leads to an increase in the rigidity of the land portions at the end of the sipe. Such a configuration is beneficial because an effect similar to that of raising the bottom of the sipe can be obtained.

Additionally, with the pneumatic tire of the present technology, a ratio B/S of a placement density B of the protrusions in a region that extends up to 20% of the sipe length having a center portion of the sipe as a center to the placement density S of the protrusions in all regions of the sipe wall face is within a range of $105\% \leq (B/S) \times 100 \leq 200\%$.

With this pneumatic tire, the placement density B of the protrusions at a center portion of the sipe is set so as to be great. Therefore, when the tire brakes, the protrusions and recesses mate, and this leads to an increase in the rigidity of the land portion at the center portion of the sipe. Such a configuration is beneficial because an effect similar to that of raising the bottom of the sipe can be obtained.

With the pneumatic tire of the present technology, when the tire brakes, an external force acts in a collapsing direction of the land portions, which leads to the sipe sealing and the protrusions and the recesses mating. Here, the placement density X of the protrusions in the sipe wall face is set so as to be greater on an opening side. Therefore, compared to a configuration where the placement density of the protrusions is uniform, a large mating force between the protrusions and recesses on the opening side of the sipe can be obtained. As a result, the rigidity of the land portions is efficiently increased and collapsing of the sipe is suppressed. Such a configuration is beneficial because the braking performance on ice and dry braking performance of the tire are enhanced.

BRIEF DESCRIPTION OF THE DRAWINGS

FIG. 7 is a table showing the results of the performance testing of the pneumatic tires according to the embodiment of the present technology.

DETAILED DESCRIPTION

Figure 1:
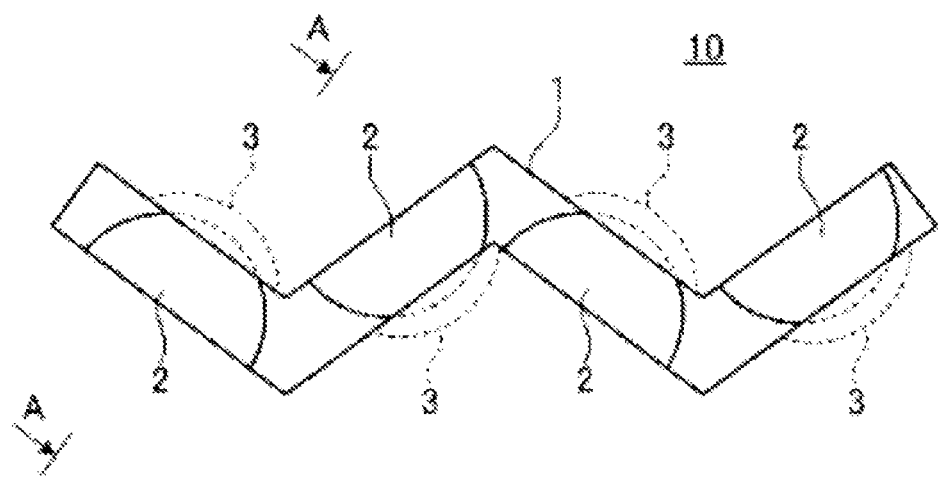
FIG. 1 is a plan view illustrating a sipe of the pneumatic tire according to an embodiment of the present technology.

The present technology is explained in detail below with reference to the accompanying drawings. However, the present technology is not limited to the embodiment. Moreover, constituents of the embodiment that can possibly or obviously be substituted while maintaining consistency with the present technology are included. Furthermore, the multiple modified examples described in the embodiment can be arbitrarily combined within the scope of obviousness by a person skilled in the art.

Pneumatic Tire

This pneumatic tire is, for example, applied to a studless tire. The pneumatic tire has a plurality of grooves and land portions that are partitioned by the grooves in a tread portion (not illustrated in the drawings). A tread pattern having a basic block pattern or rib pattern is formed by the grooves and land portions in the tread portion. For example, with a configuration having a block pattern, a plurality of circumferential main grooves extending in the tire circumferential direction, lateral grooves intersecting with the circumferential main grooves, and block-like land portions partitioned by the main grooves and the lateral grooves are formed in the tread portion.

Sipes of the Land Portions

Figure 2:
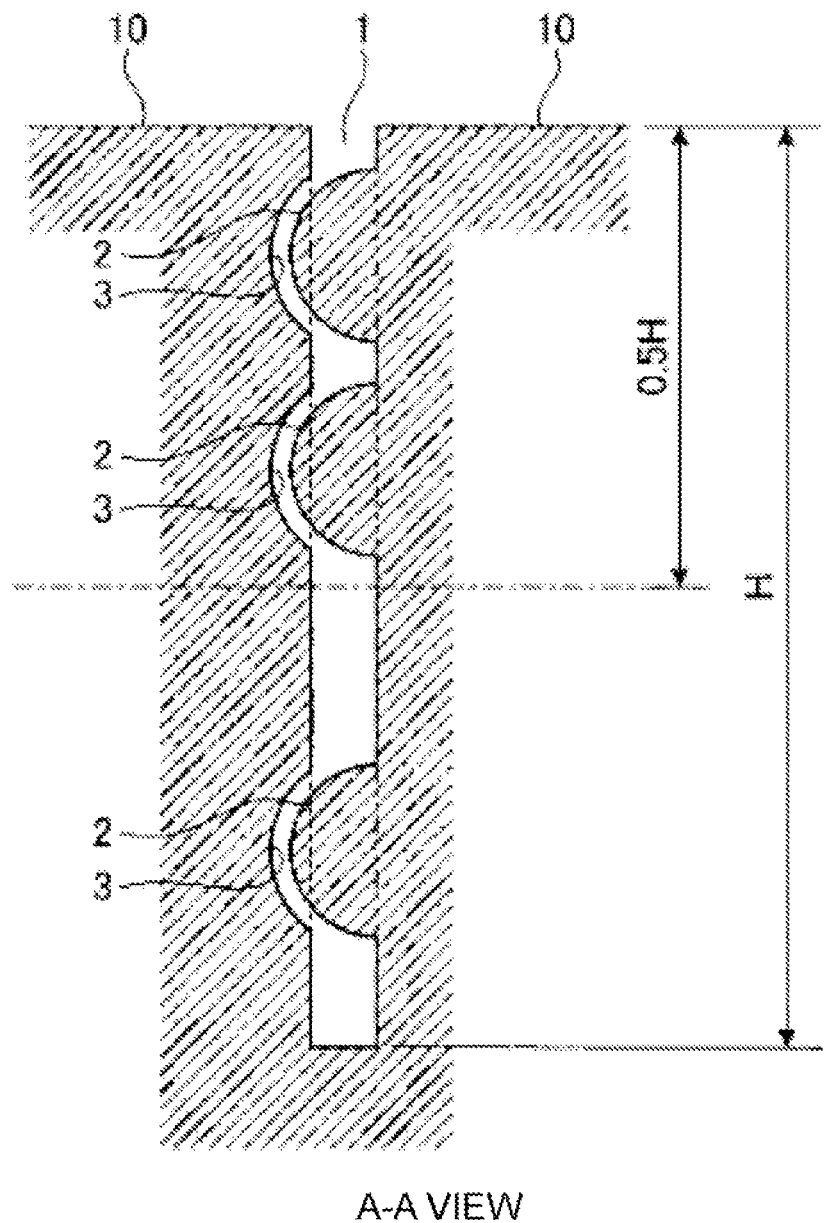
FIG. 2 is a cutaway perspective view taken along A-A illustrating the sipe depicted in FIG. 1.

FIG. 1 is a plan view illustrating a sipe of the pneumatic tire according to an embodiment of the present technology. FIG. 2 is a cutaway perspective view taken along A-A illustrating the sipe depicted in FIG. 1.

A plurality of sipes 1 extending in the tire width direction (see FIGS. 1 and 2) is formed in a land portion 10 of the pneumatic tire. The sipe 1 may be a straight sipe that extends linearly or a zigzag sipe that extends while bending. Additionally, the sipe 1 may be a planar sipe having sipe wall faces planar to a depth direction thereof or may be a three-dimensional sipe having three-dimensional sipe wall faces. Moreover, the sipe 1 may be an open sipe that penetrates the land portion 10 in a road contact direction and is open to the grooves on both sides, or may be a closed sipe that does not open to either of the grooves or a semi-closed sipe that only opens to one of the grooves.

In this embodiment, a case is described as an example wherein the sipe 1 is a zigzag sipe extending in the tire width direction, a planar sipe having planar sipe wall faces, and a closed sipe having both ends inside the land portion 10 (see FIGS. 1 and 2).

Protrusions and Recesses of the Sipe

The sipe 1 of the pneumatic tire includes protrusions 2 on a first sipe wall face of mutually opposing sipe wall faces and recesses 3 that mate with the protrusions 2 in a second sipe wall face (see FIGS. 1 and 2).

For example, in this embodiment, the sipe 1 extends in a zigzag form in the tire width direction in the road contact surface of the land portion 10, and has the protrusions 2 on a planar portion (linear portion of the zigzag form) of a first sipe wall face thereof. Additionally, recesses 3 are formed in positions opposite the protrusions 2 in a planar portion of a second sipe wall face opposite the first sipe wall face. Moreover, the protrusions 2 protrude substantially hemispherically from the first sipe wall face at a predetermined height, and the recesses 3 are recessed substantially hemispherically at a depth that is less than the height of the protrusions 2. Additionally, in an unloaded state of the tire, the protrusions 2 and the recesses 3 are in a non-contacting state. Moreover, the plurality of protrusions and recesses 2 and 3 are arranged in the sipe length direction and the sipe depth direction. Additionally, the protrusions 2 and the recesses 3 are alternately arranged in the sipe length direction in the sipe wall faces. Here, a diameter of the protrusions 2 is preferably within a range of from 0.5 mm to 4.0 mm. Additionally, the height of the protrusions 2 is preferably in a range of from 0.5 mm to 3.0 mm.

With this configuration, when the tire brakes, an external force acts in a collapsing direction of the land portion 10, which leads to the sipe 1 sealing and the protrusions 2 and the recesses 3 mating. As a result, the rigidity of the land portion 10 is efficiently increased and an amount of collapsing of the land portion 10 is reduced. With such a configuration, the braking performance on ice (braking performance on icy road surfaces) and dry braking performance (braking performance on dry road surfaces) of the tire are enhanced.

Placement Density of the Protrusions and Recesses

Figure 3:
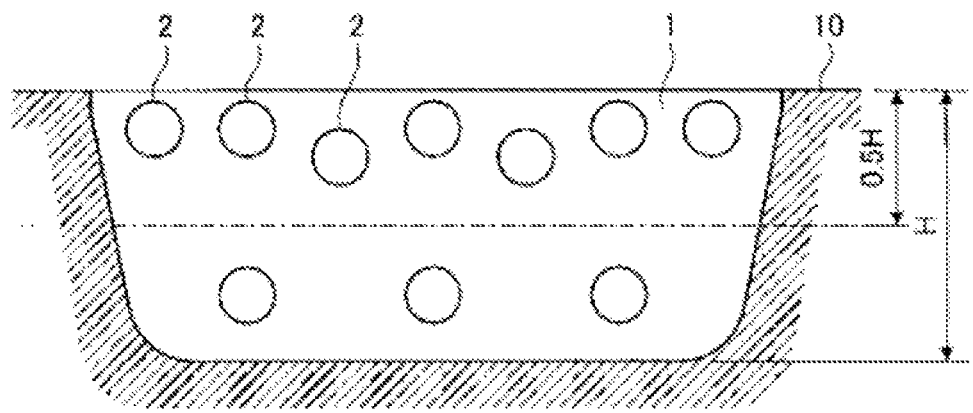
FIG. 3 is an explanatory view illustrating an arrangement pattern of protrusions of the sipe depicted in FIG. 1.

FIG. 3 is an explanatory view illustrating an arrangement pattern of the protrusions of the sipe depicted in FIG. 1. This drawing depicts a projection figure of the protrusions 2 with the sipe wall faces in an expanded state.

With the pneumatic tire, in a projection figure of the protrusions 2 with the sipe wall faces in an expanded state, a relationship between a placement density X of the protrusions 2 in a region that extends up to half of a sipe depth H from an opening (road contact surface of the land portion 10) of the sipe 1 and a placement density Y of the protrusions 2 in a region (remaining regions) that extends up to half of the sipe depth H from a bottom of the sipe 1 is X>Y (see FIG. 3). In other words, when the sipe wall face is equally bisected into an opening side region and a bottom side region, the placement density X of the protrusions 2 in the opening side region is configured so as to be greater than the placement density Y of the protrusions 2 in the bottom side region.

For example, in this embodiment, all of the protrusions 2 have the same form and the same size (see FIGS. 1 to 3). Additionally, in a projection figure of the protrusions 2 with the sipe wall faces in an expanded state, a greater number of the protrusions 2 are disposed in the opening side region. Thereby, the placement density X (placement area) of the protrusions 2 in the opening side region is configured so as to be greater than the placement density Y of the protrusions 2 in the bottom side region.

Note that "placement density X" and "placement density Y" of the protrusions 2 refer to a ratio of the placement area of the protrusions 2 in corresponding regions (the opening side region or the bottom side region) to an area of that region (area ratio).

Additionally, "sipe depth H" refers to a distance from the opening to the bottom of the sipe 1 (see FIGS. 2 and 3) when the tire is mounted on a standard rim, inflated to a standard internal pressure, and is in an unloaded state. Moreover, the sipe depth H may vary along the sipe length direction. For example, in closed sipes, in order to ensure strength of the sipe ends, the bottom of the sipe 1 may be raised at the sipe ends (see FIG. 3). In such cases, a maximum depth of the sipe is set as the sipe depth H.

Herein, "standard rim" refers to an "application rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Standard inner pressure" refers to "maximum air pressure"

defined by JATMA, the maximum value in "tire load limits at various cold inflation pressures" defined by TRA, or "inflation pressures" defined by ETRTO. Moreover, a "stipulated load" refers to "maximum load capacity" defined by JATMA, the maximum value in "tire load limits at various cold inflation pressures" defined by TRA, or "load capacity" defined by ETRTO. However, in the case of passenger car tires, the standard internal pressure is an air pressure of 180 kPa, and the stipulated load is 88% of the maximum load capacity.

Effect

As described above, with this pneumatic tire, the sipe 1 include protrusions 2 on a first sipe wall face of mutually opposing sipe wall faces and recesses 3 that mate with the protrusions 2 in a second sipe wall face (see FIGS. 1 and 2). Additionally, in a projection figure of the protrusions 2 with the sipe wall faces in an expanded state, the relationship between the placement density X of the protrusions 2 in the region that extends up to half of the sipe depth H from the opening of the sipe 1 and the placement density Y of the protrusions 2 in the region that extends up to half of the sipe depth H from the bottom of the sipe 1 is X>Y (see FIG. 2).

With this configuration, when the tire brakes, an external force acts in a collapsing direction of the land portion 10, which leads to the sipe 1 sealing and the protrusions 2 and the recesses 3 mating. Here, the placement density X of the protrusions 2 in the sipe wall face is set so as to be greater on the opening side. Therefore, compared to a configuration where the placement density of the protrusions is uniform, a large mating force between the protrusions and recesses 2 and 3 on the opening side of the sipe 1 can be obtained. As a result, the rigidity of the land portion 10 is efficiently increased and collapsing of the sipe 1 is suppressed. Such a configuration is beneficial because the braking performance on ice and dry braking performance of the tire are enhanced.

Additionally, with this configuration, the placement density X of the protrusions 2 in the opening side region is great. Therefore, compared to a configuration where the placement density of the protrusions is uniform, a large mating force between the protrusions and recesses 2 and 3 on the opening side of the sipe 1 can be obtained. Such a configuration is beneficial because peeling of the sipe 1 is effectively suppressed and the uneven wear resistance performance of the tire is enhanced.

Additionally, with this configuration, the placement density Y of the protrusions 2 in the bottom side region is small. Therefore, compared to a configuration where the placement density of the protrusions is uniform, the placement density of the protrusions 2 in the sipe 1 decreases at intermediate to late stages of wear of the land portion 10. Therefore, at a stage of initial wear, when the tire brakes, the rigidity of the land portion 10 is increased due to the mating of the protrusions and recesses 2 and 3; at a stages of intermediate wear and further, the protrusions and recesses 2 and 3 are worn and reduced, which makes it possible for the sipe 1 to collapse. This is beneficial because the edge effect of the sipe 1 can be obtained.

Note that, with this pneumatic tire, the ratio X/S of the placement density X of the protrusions 2 in the opening side region of the sipe wall face to a placement density S of the protrusions 2 in all regions of the sipe wall face is preferably within a range of 105%≤(X/S)×100≤200% (see FIG. 3). Additionally, the ratio X/S is more preferably within a range of 110%≤(X/S)×100≤150%. With this configuration, the placement density X of the protrusions 2 in the opening side region is optimized. Therefore, optimal braking performance on ice and dry braking performance of the tire are ensured or enhanced.

For example, in this embodiment, all of the protrusions 2 have the same form and the same size, and many of the protrusions 2 are disposed in the opening side region of the sipe 1 (see FIG. 3). Thereby, the placement density X of the protrusions 2 in the opening side region of the sipe 1 is configured to be dense and, thus, a reinforcing effect of the land portion 10 caused by the mating of the protrusions and recesses 2 and 3 is enhanced. Additionally, here, a plurality of the protrusions 2 is arranged along the opening (the road contact surface of the land portion 10) of the sipe 1. Specifically, the protrusions 2 are disposed in a concentrated manner in a region (in the vicinity of the opening) up to about ⅓ of the sipe depth H from the opening of the sipe 1. Thereby, during initial wear of the tire when the sipe depth H is great, the reinforcing effect of the land portion 10 caused by the mating of the protrusions and recesses 2 and 3 is enhanced.

First Modified Example

Figure 4:
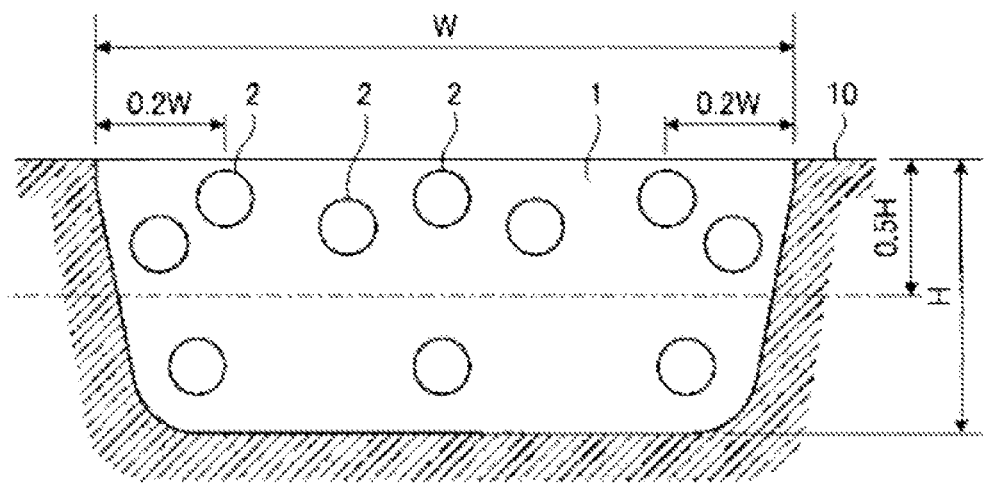
FIG. 4 is an explanatory view illustrating a first modified example of the pneumatic tire depicted in FIG. 1.

Moreover, with this pneumatic tire, at at least one end of the sipe 1, a ratio A/S of a placement density A of the protrusions 2 in a region that extends up to 20% of a sipe length W (0.2W) from the end of the sipe 1 to a placement density S of the protrusions 2 in all regions of the sipe wall face is preferably within a range of 105%≤(A/S)×100≤250% (see FIG. 4). With this configuration, the placement density A of the protrusions 2 at the end of the sipe 1 is set so as to be great. Therefore, when the tire brakes, the protrusions and recesses 2 and 3 mate, and this leads to an increase in the rigidity of the land portion 10 at the end of the sipe 1. Such a configuration is beneficial because an effect similar to that of raising the bottom of the sipe 1 can be obtained.

For example, in this embodiment, all of the protrusions 2 have the same form and the same size, and many of the protrusions 2 are disposed in regions (regions 20% of the sipe length W) at both ends of the sipe 1 (see FIG. 4). Specifically, compared to the configuration illustrated in FIG. 3, some of the protrusions 2 are disposed so as to be slightly closer to the end side of the sipe 1. Thereby, the placement density A of the protrusions 2 in the regions at both ends of the sipe 1 is configured to be dense and, thus, a reinforcing effect of the land portion 10 caused by the mating of the protrusions and recesses 2 and 3 is enhanced.

Additionally, in this embodiment, the sipe 1 is a closed sipe (see FIGS. 1 and 4), however this embodiment is not limited thereto and even when the sipe 1 is an open sipe or a semi-closed sipe, likewise, the placement density A of the protrusions 2 at the end of the sipe 1 may be configured so as to be great (not illustrated in the drawings). For example, with a configuration where the end of the sipe 1 is open to the main groove, rigidity of the land portion 10 at an open end of the sipe 1 is insufficient. Therefore, by configuring the placement density A of the protrusions 2 at the open end of the sipe 1 to be great, an effect similar to that of raising the bottom of the sipe 1 can be obtained.

Note that, "sipe length W" refers to a total length of the sipe 1 in the tire tread surface (see FIG. 4) when the tire is mounted on a standard rim, inflated to a standard internal pressure, and is in an unloaded state.

Second Modified Example

Figures 5, 6:
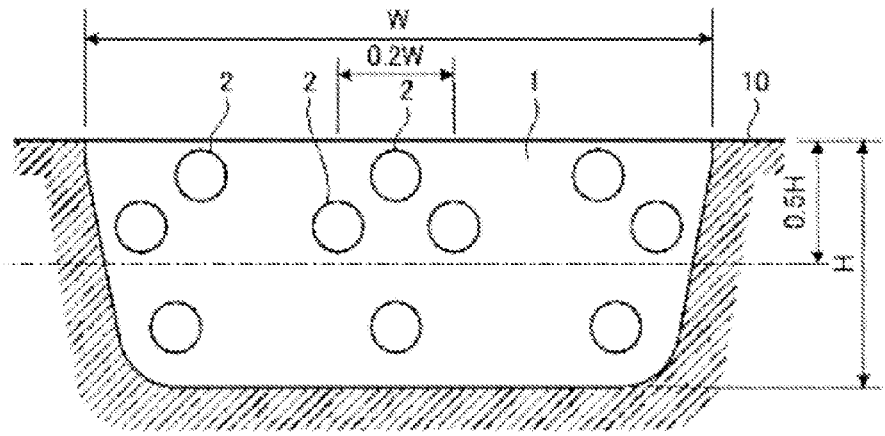
FIG. 5 is an explanatory view illustrating a second modified example of the pneumatic tire depicted in FIG. 1.
FIG. 6 is a table showing the results of performance testing of pneumatic tires according to the embodiment of the present technology.

Additionally, with this pneumatic tire, a ratio B/S of a placement density B of the protrusions 2 in a region that extends up to 20% of the sipe length W having a center portion of the sipe 1 as a center to the placement density S of the protrusions 2 in all regions of the sipe wall face is within a range of 105%≤(B/S)×100≤200% (see FIG. 5). With this configuration, the placement density B of the protrusions 2 at the center portion of the sipe 1 is set so as to be great. Therefore, when the tire brakes, the protrusions and recesses 2 and 3 mate, and this leads to an increase in the rigidity of the land portion 10 at the center portion of the sipe 1. Such a configuration is beneficial because an effect similar to that of raising the bottom of the sipe 1 can be obtained.

For example, in this embodiment, all of the protrusions 2 have the same form and the same size, and many of the protrusions 2 are disposed in regions (regions 20% of the sipe length W) at the center of the sipe 1 (see FIG. 5). Specifically, compared to the configuration illustrated in FIG. 4, some of the protrusions 2 are disposed so as to be slightly closer to the center portion side of the sipe 1. Thereby, the placement density B of the protrusions 2 in the regions at the center portion of the sipe 1 is configured to be dense and, thus, a reinforcing effect of the land portion 10 caused by the mating of the protrusions and recesses 2 and 3 is enhanced. Note that in this embodiment, the center portion of the sipe 1 is a center point of the sipe length W (a position 0.5W from the end of the sipe 1).

Performance Tests

FIGS. 6 and 7 are tables showing the results of performance testing of pneumatic tires according to the embodiment of the present technology. In the embodiment, performance tests for (1) dry braking performance and (2) braking performance on ice were performed on a plurality of types of pneumatic tires under different conditions (see FIGS. 6 and 7). In each of the performance tests, radial studless tires with a tire size of 195/65R15 are mounted on JATMA defined application rims. The pneumatic tires are inflated to a standard internal pressure and loaded with a stipulated load.

(1) In the performance test for dry braking performance, the pneumatic tire was mounted on a test vehicle and driven on a dry road surface at a speed of 100 km/hr. Brakes were applied to the traveling vehicle (evaluated tire: 195/65R15, evaluated vehicle: Corolla) and the braking distance from where the brakes were applied to where the vehicle stopped was measured. Based on the measurement results, an indexed evaluation was performed using the conventional example as a benchmark (100). With this evaluation, larger numbers are more preferable.

(2) In the performance test for braking performance on ice, the pneumatic tire was mounted on a test vehicle and driven on an icy road surface at a speed of 40 km/hr. Brakes were applied to the traveling vehicle (evaluated tire: 195/65R15, evaluated vehicle: Corolla) and the braking distance from where the brakes were applied to where the vehicle stopped was measured. This performance test was conducted on both new tires and tires that were worn 50%, and the braking distances were measured. Based on the measurement results, an indexed evaluation was performed using the conventional example as a benchmark (100). With this evaluation, larger numbers are more preferable.

A pneumatic tire of a Conventional Example has a tread pattern with a basic block pattern, and land portions (blocks) have a plurality of sipes formed therein (not illustrated in the drawings). Additionally, the sipe depth H is set to 6 mm and the sipe length is set to 10 mm. Moreover, pluralities of protrusions and recesses are formed in the sipe wall faces of these sipes. Additionally, in a projection figure of the protrusions with the sipe wall faces in an expanded state, the protrusions are disposed in a substantially uniform manner. Specifically, a ratio X/S of a placement density X of the protrusions in a region that extends up to half (3 mm from the opening) of a sipe depth H from the opening of the sipe to a placement density S of the protrusions in all regions of the sipe wall face is configured to be (X/S)×100=100%.

The pneumatic tires of the Working Examples 1 to 11, compared to the pneumatic tire of the Conventional Example, differ in that they have a ratio X/S of the placement density X of the protrusions of the opening to the placement density S of the protrusions of all the regions that is configured to be within a range of 105%≤(X/S)×100≤200%.

Figure 8:
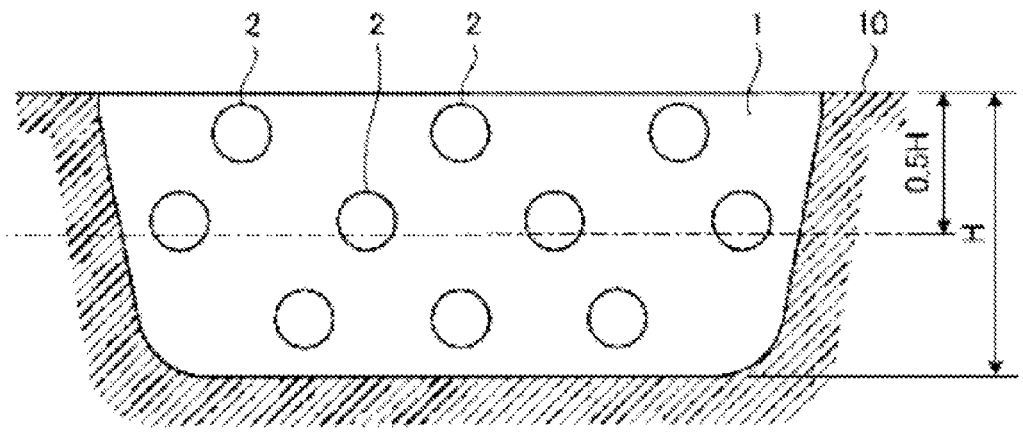
FIG. 8 is an explanatory view illustrating a synopsis of the performance testing of the pneumatic tires according to the embodiment of the present technology.

As shown in the test results, in a comparison of the Working Examples 1 to 11 and the Conventional Example, with the pneumatic tires of Working Examples 1 to 11, it is clear that the braking performance on ice of the tires (at least the braking performance on ice at 50% wear) was enhanced (see FIGS. 6 and 7). Additionally, in a comparison of Working Examples 1 to 4, it is clear that braking performance on ice and dry braking performance of the tire are enhanced due to the optimization of the ratio X/S of the placement density X of the protrusions in an opening side to the placement density S of the protrusions in all the regions. For example, with the pneumatic tire of Working Example 3 (see FIG. 8), it is clear that braking performance on ice at 50% wear is enhanced by simply configuring the ratio to be (X/S)×100=110%.

Moreover, in a comparison of Working Example 1 and Working Examples 6 to 8, it is clear that braking performance on ice and dry braking performance of the tire are further enhanced due to the optimization of the ratio A/S of the placement density A of the protrusions 2 in a region (the region 2 mm from each of both ends) that extends up to 20% of a sipe length W from the end of the sipe 1 to a placement density S of the protrusions 2 in all regions of the sipe wall face.

Figure 9:
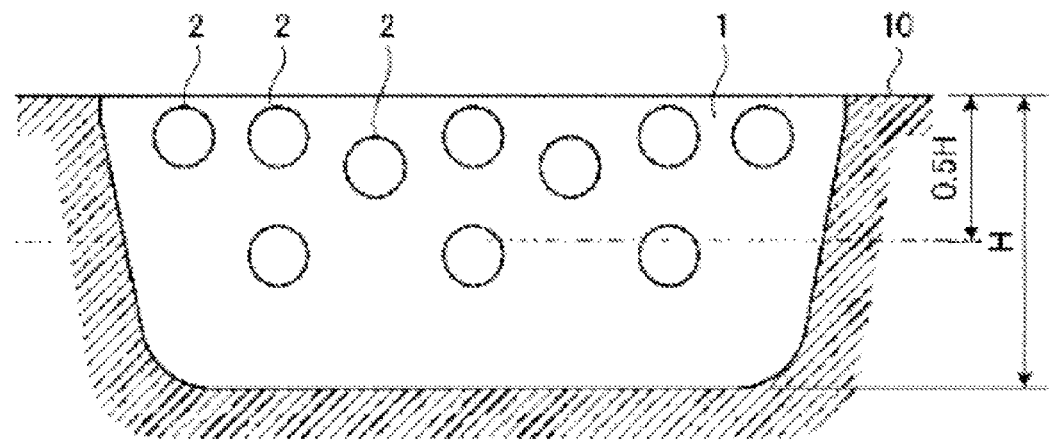
FIG. 9 is an explanatory view illustrating a synopsis of the performance testing of the pneumatic tires according to the embodiment of the present technology.

Moreover, in a comparison of Working Example 7 and Working Examples 9 to 11, it is clear that braking performance on ice and dry braking performance of the tire are further enhanced due to the optimization of the ratio B/S of the placement density B of the protrusions 2 in a region (the region 4 mm to 6 mm from each of both ends) that extends up to 20% of the sipe length W having the center portion of the sipe 1 as the center to the placement density S of the protrusions 2 in all regions of the sipe wall face. Note that FIG. 9 illustrates a disposal pattern of the protrusions in the pneumatic tire of Working Example 10.

As described above, the pneumatic tire according to the present technology is advantageous because braking performance on ice of the tire can be enhanced.

What is claimed is:

1. A pneumatic tire comprising, in a tread portion, a plurality of grooves and a land portion partitioned by the grooves, wherein the land portion comprises a plurality of sipes extending in a tire width direction, wherein the sipes include protrusions on a first sipe wall face of mutually opposing sipe wall faces and recesses that mate with the protrusions in a second sipe wall face, the sipes extending in a zigzag form in a road contact surface of the land portion where the protrusions and the recesses are disposed on a planar portion of the zigzag form of the sipe wall faces;

in a projection figure of the protrusions with the sipe wall faces in an expanded state, a relationship between a placement density X of the protrusions in a region that extends up to half of a sipe depth from an opening of the sipe and a placement density Y of the protrusions in a region that extends up to half of the sipe depth from a bottom of the sipe is X>Y; and a depth of the recesses with respect to the second sipe wall face is less than a height of the protrusions with respect to the first sipe wall face.

2. The pneumatic tire according to claim 1, wherein a ratio X/S of the placement density X of the protrusions to a placement density S of the protrusions in all regions of the sipe wall face is within a range of 105%≤(X/S)×100≤200%.

3. The pneumatic tire according to claim 1, wherein, at least one end of the sipe, a ratio A/S of a placement density A of the protrusions in a region that extends up to 20% of a sipe length from the end of the sipe to a placement density S of the protrusions in all regions of the sipe wall face is within a range of 105%≤(A/S)×100≤250%.

4. The pneumatic tire according to claim 1, wherein a ratio B/S of a placement density B of the protrusions in a region that extends up to 10% on each side of a center of the sipe length having a center portion of the sipe as a center to the placement density S of the protrusions in all regions of the sipe wall face is within a range of 105%≤(B/S)×100≤200%.

5. The pneumatic tire according to claim 1, wherein the protrusions are hemispherical.

6. The pneumatic tire according to claim 1, wherein the recesses are recessed at a depth that is less than a height of the protrusions.

7. The pneumatic tire according to claim 1, wherein the protrusions on the first sipe wall face are alternately arranged with recesses in the first sipe wall face in a sipe length direction, and wherein the recesses in the second sipe wall face are alternately arranged with protrusions in the second sipe wall face in the sipe length direction.

8. The pneumatic tire according to claim 1, wherein the protrusions have a diameter of from 0.5 mm to 4.0 mm.

9. The pneumatic tire according to claim 1, wherein the protrusions have a height of from 0.5 mm to 3.0 mm.

10. The pneumatic tire according to claim 1, wherein the sipes are zigzag sipes that extend while bending when the tire is mounted on a standard rim, inflated to a standard internal pressure, and is in an unloaded state.

11. The pneumatic tire according to claim 1, wherein the first and second sipe walls are perpendicular to a depth direction of the sipes.

12. The pneumatic tire according to claim 1, wherein the first and second sipe wall faces are non-perpendicular sipe wall faces.

13. The pneumatic tire according to claim 1, wherein the sipes are open at ends of the sipes.

14. The pneumatic tire according to claim 1, wherein the sipes are closed at a first end of a sipe and open at a second end of the sipe.

15. The pneumatic tire according to claim 1, wherein the sipes are closed at ends of the sipes.

16. The pneumatic tire according to claim 1, wherein the protrusions have a uniform size.

17. The pneumatic tire according to claim 1, wherein a ratio X/S of the placement density X of the protrusions to a placement density S of the protrusions in all regions of the sipe wall face is within a range of 110%≤(X/S)×100≤150%.

18. The pneumatic tire according to claim 1, wherein the protrusions are disposed in a region up to one third of the sipe depth from an opening of the sipes.

19. The pneumatic tire according to claim 1, wherein the protrusions are disposed in a greater number at ends of the sipes than a region near a center of the sipes.

20. A pneumatic tire comprising, in a tread portion, a plurality of grooves and a land portion partitioned by the grooves, wherein
the land portion comprises a plurality of sipes extending in a tire width direction,
the sipes include protrusions on a planar portion of a first sipe wall face of mutually opposing sipe wall faces and recesses that mate with the protrusions in a planar portion of a second sipe wall face;
in a projection figure of the protrusions with the sipe wall faces in an expanded state, a relationship between a placement density X of the protrusions in a region that extends up to half a sipe depth from an opening of the sipe and a placement density Y of the protrusions in a region that extends up to half of the sipe depth from a bottom of the sipe is X>Y; and
a depth of the recesses with respect to the second sipe wall face is less than a height of the protrusions with respect to the first sipe wall face.

* * * * *